(12) United States Patent
Danneberg et al.

(10) Patent No.: US 12,083,877 B2
(45) Date of Patent: Sep. 10, 2024

(54) VEHICLE FLOOR FOR AN ENERGY-STORE FLOOR ASSEMBLY OF A MOTOR VEHICLE

(71) Applicant: Bayerische Motoren Werke Aktiengesellschaft, Munich (DE)

(72) Inventors: Jan Danneberg, Munich (DE); Roccy Steffen Grahl, Munich (DE); Ronny Grosse, Eichenau (DE); Juergen Leschhorn, Geltendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 284 days.

(21) Appl. No.: 17/630,591

(22) PCT Filed: Sep. 4, 2020

(86) PCT No.: PCT/EP2020/074786
§ 371 (c)(1),
(2) Date: Jan. 27, 2022

(87) PCT Pub. No.: WO2021/043993
PCT Pub. Date: Mar. 11, 2021

(65) Prior Publication Data
US 2022/0250459 A1    Aug. 11, 2022

(30) Foreign Application Priority Data
Sep. 5, 2019   (DE) .................... 10 2019 123 844.7

(51) Int. Cl.
*B60K 1/04*    (2019.01)
*B62D 25/20*   (2006.01)

(52) U.S. Cl.
CPC ............... *B60K 1/04* (2013.01); *B62D 25/20* (2013.01); *B60K 2001/0438* (2013.01)

(58) Field of Classification Search
CPC .. B60K 1/04; B60K 2001/0438; B62D 25/20; B62D 25/24
See application file for complete search history.

(56) References Cited

U.S. PATENT DOCUMENTS

| | | | |
|---|---|---|---|
| 4,836,600 A | 6/1989 | Miyazaki et al. | |
| 10,661,840 B1* | 5/2020 | Saje ................... | B62D 25/2018 |

(Continued)

FOREIGN PATENT DOCUMENTS

| | | |
|---|---|---|
| CN | 103253308 A | 8/2013 |
| CN | 105144425 A | 12/2015 |

(Continued)

OTHER PUBLICATIONS

English translation of Chinese-language Office Action issued in Chinese Application No. 202080051918.2 dated Apr. 11, 2023 (8 pages).

(Continued)

*Primary Examiner* — Jeffrey J Restifo
(74) *Attorney, Agent, or Firm* — Crowell & Moring LLP

(57) ABSTRACT

A vehicle floor for an energy-store floor assembly of a motor vehicle, is arranged on the top of an electrical energy-store device which comprises a plurality of battery modules and is accommodated in a multi-part store housing. A main floor of the vehicle floor extends, in the vehicle longitudinal direction, forward at least up to a transition region to a front bulkhead and rearward at least up to a floor region below and behind a front row of vehicle seats. In order to provide a vehicle floor for an energy-store floor assembly of a motor vehicle, the vehicle floor having an additional function and contributing to the fulfillment of characteristics required of a store housing with regard to the sealing tightness of the (Continued)

store housing, the vehicle floor is a housing part of the store housing and at least the main floor of the vehicle floor is formed as a single piece.

14 Claims, 4 Drawing Sheets

(56) References Cited

U.S. PATENT DOCUMENTS

| | | | |
|---|---|---|---|
| 11,851,110 B2* | 12/2023 | Hirota | B62D 27/065 |
| 2010/0307848 A1 | 12/2010 | Hashimoto et al. | |
| 2011/0174556 A1* | 7/2011 | Hermann | B60L 50/64 |
| | | | 429/62 |
| 2012/0161429 A1* | 6/2012 | Rawlinson | B62D 25/025 |
| | | | 280/801.1 |
| 2012/0161472 A1* | 6/2012 | Rawlinson | B60R 16/04 |
| | | | 296/187.08 |
| 2012/0169089 A1* | 7/2012 | Rawlinson | B62D 25/087 |
| | | | 296/193.08 |
| 2013/0088045 A1* | 4/2013 | Charbonneau | B62D 25/2036 |
| | | | 296/187.12 |
| 2013/0126254 A1 | 5/2013 | Lee et al. | |
| 2013/0153317 A1* | 6/2013 | Rawlinson | F41H 7/042 |
| | | | 180/68.5 |
| 2014/0193683 A1* | 7/2014 | Mardall | B60K 1/04 |
| | | | 429/99 |
| 2014/0284125 A1 | 9/2014 | Katayama et al. | |
| 2016/0006008 A1 | 1/2016 | Volz | |
| 2017/0001586 A1 | 1/2017 | Ashraf et al. | |
| 2017/0305249 A1* | 10/2017 | Hara | B62D 25/2036 |
| 2017/0305250 A1 | 10/2017 | Hara | |
| 2017/0305251 A1* | 10/2017 | Hara | H01M 50/262 |
| 2018/0108891 A1* | 4/2018 | Fees | H01M 50/51 |
| 2018/0361874 A1* | 12/2018 | Kobayashi | H01M 50/227 |
| 2018/0370570 A1 | 12/2018 | Ayukawa | |
| 2019/0047419 A1* | 2/2019 | Kellner | B60K 1/04 |
| 2019/0092395 A1* | 3/2019 | Makowski | H01M 50/249 |
| 2019/0217695 A1* | 7/2019 | Hofer | H01M 50/147 |
| 2019/0232773 A1 | 8/2019 | Kasai et al. | |
| 2019/0337575 A1 | 11/2019 | Kellner et al. | |
| 2020/0262284 A1* | 8/2020 | Shirooka | H01M 10/625 |
| 2020/0376947 A1* | 12/2020 | Yamada | B60K 1/04 |
| 2020/0376948 A1* | 12/2020 | Yamada | B62D 25/20 |
| 2020/0381686 A1* | 12/2020 | Yamada | B60L 50/66 |
| 2021/0359374 A1* | 11/2021 | Reinprecht | H01M 50/209 |
| 2022/0144068 A1* | 5/2022 | Burja | B60L 58/26 |
| 2022/0250459 A1* | 8/2022 | Danneberg | B60K 1/04 |
| 2022/0258586 A1* | 8/2022 | Amsz | B60K 1/04 |
| 2022/0297523 A1* | 9/2022 | Danneberg | H01M 50/258 |
| 2022/0314772 A1* | 10/2022 | Kim | H01M 50/291 |
| 2022/0340212 A1* | 10/2022 | Danneberg | B62D 25/025 |
| 2023/0264563 A1* | 8/2023 | Kamemoto | B62D 21/07 |
| | | | 180/68.5 |
| 2023/0264758 A1* | 8/2023 | Carl | B62D 25/20 |
| | | | 296/187.12 |
| 2023/0311631 A1* | 10/2023 | Boeck | B62D 21/155 |
| | | | 180/68.5 |

FOREIGN PATENT DOCUMENTS

| | | |
|---|---|---|
| CN | 109131592 A | 1/2019 |
| CN | 208393092 U | 1/2019 |
| CN | 109703347 A | 5/2019 |
| CN | 110091927 A | 8/2019 |
| DE | 19 57 893 A1 | 5/1971 |
| DE | 38 13 455 A1 | 11/1988 |
| DE | 10 2010 022 876 A1 | 1/2011 |
| DE | 10 2017 206 586 A1 | 10/2017 |
| DE | 10 2018 115 211 A1 | 12/2018 |
| DE | 10 2018 110 481 B3 | 3/2019 |
| DE | 10 2018 113 812 A1 | 12/2019 |
| EP | 2 468 609 A2 | 6/2012 |
| JP | 7-156826 A | 6/1995 |
| JP | 2006-182295 A | 7/2006 |
| JP | 2012-56395 A | 3/2012 |
| WO | WO 2011/007501 A1 | 1/2011 |

OTHER PUBLICATIONS

International Search Report (PCT/ISA/210) issued in PCT Application No. PCT/EP2020/074786 dated Nov. 2, 2020 with English translation (four (4) pages).

German-language Written Opinion (PCT/ISA/237) issued in PCT Application No. PCT/EP2020/074786 dated Nov. 2, 2020 (six (6) pages).

German-language Search Report issued in German Application No. 10 2019 123 844.7 dated Aug. 12, 2020 with partial English translation (11 pages).

* cited by examiner

VEHICLE FLOOR FOR AN ENERGY-STORE FLOOR ASSEMBLY OF A MOTOR VEHICLE

BACKGROUND AND SUMMARY OF THE INVENTION

The invention relates to a vehicle floor for an energy-store floor assembly of a motor vehicle. The invention moreover relates to an energy-store floor assembly for a motor vehicle.

A vehicle floor of an energy-store floor assembly for a motor vehicle is already known from EP 2 468 609 A2, the vehicle floor being laterally delimited by a respective rocker panel and being reinforced by chassis beams and/or crossbeams. The vehicle floor in the vehicle longitudinal direction by way of a main floor extends toward the front at least up to a transition region to a front bulkhead of the motor vehicle passenger cabin, and toward the rear at least up to a floor region below and behind a front row of vehicle seats.

The vehicle floor here is disposed on an upper side of a plurality of battery modules of an electric energy-store installation that serves for supplying an electric drive of the motor vehicle with electric power and is received in a multiple-part storage housing. The storage housing here is formed by an upper shell and a lower shell and has a frame-type construction of profile elements, which encircle the external circumferential side, and a plurality of crossbeams so that the storage housing is configured so as to be inherently stiff. The storage housing here, on the lower side of the vehicle floor, is fastened by way of a plurality of respective screw connections in the region of the rocker panels and of the crossbeams.

As this storage housing is configured as a unit that is separate from the motor vehicle body-in-white, only requirements in terms of the static and dynamic properties as well as of the crash characteristics are to be met with a view to attaching the storage housing to the motor vehicle body-in-white. Thus, the vehicle floor according to the prior art does also not have any further function.

It is an object of the present invention to provide a vehicle floor for an energy-store floor assembly of a motor vehicle that has a further function and contributes toward meeting the properties that this storage housing has to meet in terms of the tightness thereof.

This object is achieved according to the invention by a vehicle floor for an energy-store floor assembly of a motor vehicle having the features of the independent claim. The object is moreover achieved by an energy-store floor assembly of a motor vehicle having such a vehicle floor. Advantageous design embodiments having favorable refinements are the subject matter of the dependent claims.

The vehicle floor according to the invention is disposed on the upper side of the electric energy-store installation, which comprises a plurality of battery modules and is received in a multiple-part storage housing, and by way of a main floor extends in the vehicle longitudinal direction toward the front at least up to a transition region to a front bulkhead and to the rear at least up to a floor region below and behind a front row of vehicle seats. According to the invention, the vehicle floor here is configured as a housing part of the storage housing and designed so as to be formed of a single piece for at least the main floor of the storage housing.

The utilization of the vehicle floor as part of the motor vehicle body, or of the body-in-white, respectively, on the one hand, and as a housing part of the storage housing, on the other hand, here has the advantage of dual utilization, this leading to a significant saving in terms of installation space, weight and production input. Moreover, the energy-store installation is thus received in a storage housing that is integrated in the body or the body-in-white, respectively, so that the storage housing in terms of the crash requirements is particularly favorably integrated in the body, or the body-in-white, respectively, of the motor vehicle.

In order for reliable, simple and cost-effective sealing of the storage housing in the region of the vehicle floor to be achieved here, at least the main floor is formed as a single piece. As opposed to customary vehicle floors for motor vehicle bodies that are usually assembled from a multiplicity of joined individual parts, in particular sheet-metal parts, it is thus provided according to the invention that the complexity for inherently sealing the vehicle floor as well as in relation to the at least one further housing part of the storage housing is minimized by reducing this parts count. Or in other words: as a result of the avoidance of joints in the region of the main floor, potential leaks as well as leakages between the vehicle floor and the at least one further housing part are avoided in that the vehicle floor, in particular in the region of the joint with the further housing part, is integrally configured and consequently has no joints or the like. Specifically, it has been demonstrated that the connection between the vehicle floor and the at least one further housing part is far easier to produce in a tight manner when at least the main floor is configured without interruptions, or in an integral manner, respectively.

As a result, through the use of the vehicle floor, on the one hand, as part of the motor vehicle body respectively of the body-in-white, and on the other hand, as a housing part of the storage housing, a weight- and cost-friendly dual use is achieved, and through the integral design of the main floor a simplified connection and sealing of the storage housing is achieved.

In a further design embodiment of the invention, a rear floor adjoins the main floor to the rear in the vehicle longitudinal direction. As a result, a modular design of the vehicle floor across a plurality of variants of construction of one or a plurality of vehicle models is possible, wherein only the main floor is used in one case, for example, and the main floor and the rear floor are used in another case. Very positive sealing of the storage housing is thus possible also in this design embodiment because only one joint between the main floor and the rear floor, or in relation to the further housing part, respectively, has to be sealed. Moreover, the separation of the vehicle floor into the main floor and the rear floor enables a modular capability of the vehicle floor to be readily implemented so that vehicles having only one row of vehicle seats comprise only the main floor, for example, and vehicles having two rows of vehicle seats comprise both the main floor as well as the rear floor. In one particular embodiment it would optionally also be conceivable for the main floor and the rear floor to be integrally configured.

One further advantageous embodiment of the invention provides that the rear floor extends below a rear row of vehicle seats. Relatively much installation space is present in this region so that the storage housing in this region can have an enlarged cross section, for example for accommodating a connector panel for electrical components as well as components of the type disposed within the storage housing.

It has furthermore proven advantageous for the main floor and the rear floor to be connected to one another by way of a gas-tight connection. In the event of a correspondingly severe accident or any other emergency it is thus ensured by way of this gas-tight connection between the vehicle floor, or the body-in-white, respectively, on the one hand, and the further housing part, on the other hand, that gas cannot leak from the storage housing. As a result, the required tightness of the storage housing is guaranteed also in an emergency.

In order to moreover avoid any leakage of gas into the interior of the motor vehicle, the gas-tight connection between the main floor and the rear floor in a further design embodiment of the invention is formed by a joint and/or a mechanical connection, and additionally by way of at least one sealing element. The sealing between the components here is in particular performed in the body-in-white or during the painting process of the motor vehicle body, respectively.

A further preferred embodiment of the invention provides that the rear floor has a heel panel which extends at least substantially in the vehicle vertical direction. Also as a result of this measure, the installation space below a rear row of vehicle seats can be utilized in an optimal manner, for example, and the storage housing in this region can be formed with an enlarged cross section so as to accommodate here a connector panel for electrical components as well as components of the type disposed within the storage housing.

In a further design embodiment of the invention the vehicle floor by way of at least one gas-tight connection is connected to at least one further housing part of the storage housing. The integral design embodiment of the main floor, or of the vehicle floor, respectively, is particularly favorable here because an abutment joint or a so-called panel joint between the main floor and the rear floor would have to be potentially taken into account, this requiring special sealing measures. However, if the vehicle floor comprises only the main floor, or if the main floor and the rear floor are integrally configured according to one further advantageous embodiment, the set of issues of such an abutment joint or panel joint does not exist in the first place.

It has furthermore proven advantageous for the main floor and the rear floor to be connected to one another by way of a flanged connection which is smoothed at least in the region of the connection to the further housing part. The gas-tight connection between the two floor parts can be produced in a particularly reliable manner as a result of smoothing in this manner. Moreover, a particularly reliable gas-tight connection between the vehicle floor and the further housing part in the region of such an abutment joint or panel joint, respectively, can be achieved, specifically in particular in the region of the gas-tight connection between the vehicle floor at the transition from the main floor to the rear floor, on the one hand, and to the further housing part, on the other hand.

One further advantageous design embodiment of the invention provides that the vehicle floor is configured as part of the painted motor vehicle body-in-white. Accordingly, an energy-store floor assembly has proven particularly advantageous in which the vehicle floor is assembled in a customary manner in the body-in-white stage and subsequently in the context of a cathodic dip-paint coat and optionally in the context of a further painting process can be provided with corresponding paint layers, whereupon the assembly of the storage housing can take place while configuring the gas-tight connection. As a result, a method which is particularly simple and rapid in terms of production technology can be achieved. Moreover, a connection possibility between the main floor and the rear floor which is simple in terms of production technology is derived, because the joint and/or seal provided therebetween correspondingly expands, cures or the like in the course of the painting procedure.

The invention also comprises an energy-store floor assembly having the vehicle floor according to the invention and according to patent claim 10. The advantages described in the context of the vehicle floor here are also to be considered as advantages of the energy-store floor assembly.

Further features of the invention will emerge from the claims, from the figures and from the description of the figures. The features and combinations of features mentioned above in the description, and the features and combinations of features mentioned below in the description of the figures and/or shown in the figures alone, may be used not only in the respectively specified combination but also in other combinations or individually.

The invention will now be explained in more detail by means of a preferred exemplary embodiment as well as with reference to the drawings.

DETAILED DESCRIPTION OF THE DRAWINGS

Figure 1:
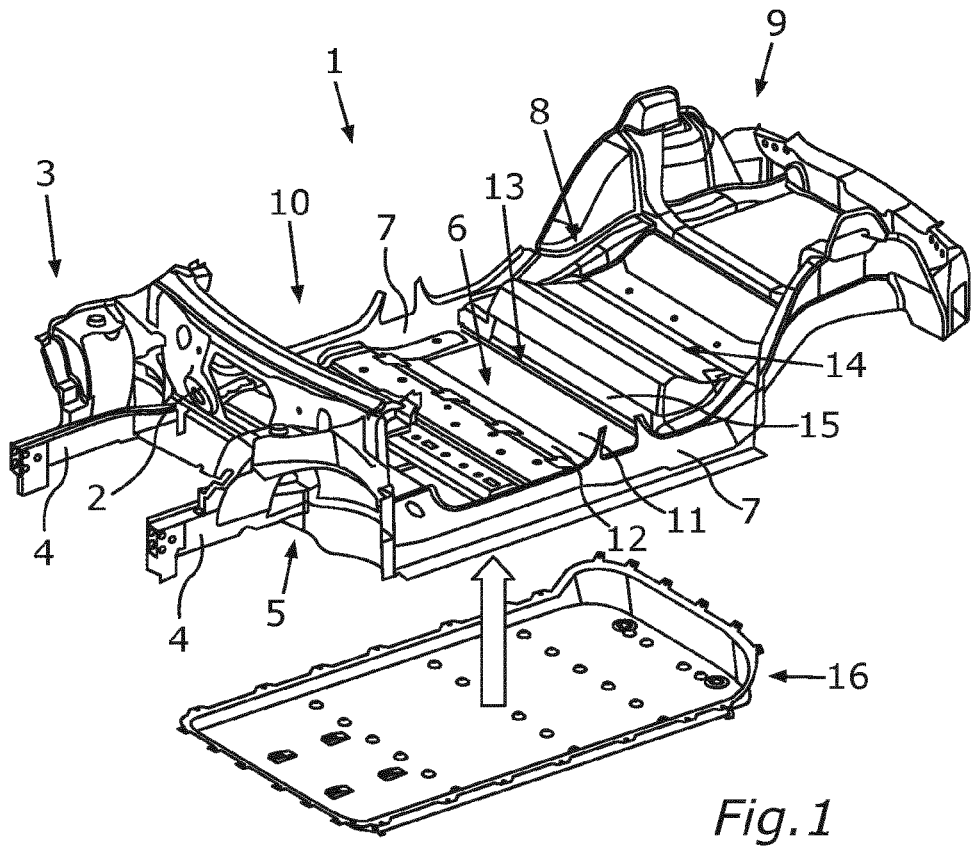
FIG. 1 is an exploded illustration of an energy-store floor assembly for a motor vehicle, having a body-in-white vehicle floor according to an embodiment of the invention of a motor vehicle body, the vehicle floor configuring a housing part of a storage housing on which, as a further housing part of the storage housing, a floor element is able to be attached according to the illustrated arrow, as a result of which a gas-tight storage housing for receiving an electric energy-store installation comprising a plurality of battery modules is achieved.
Figure 2:
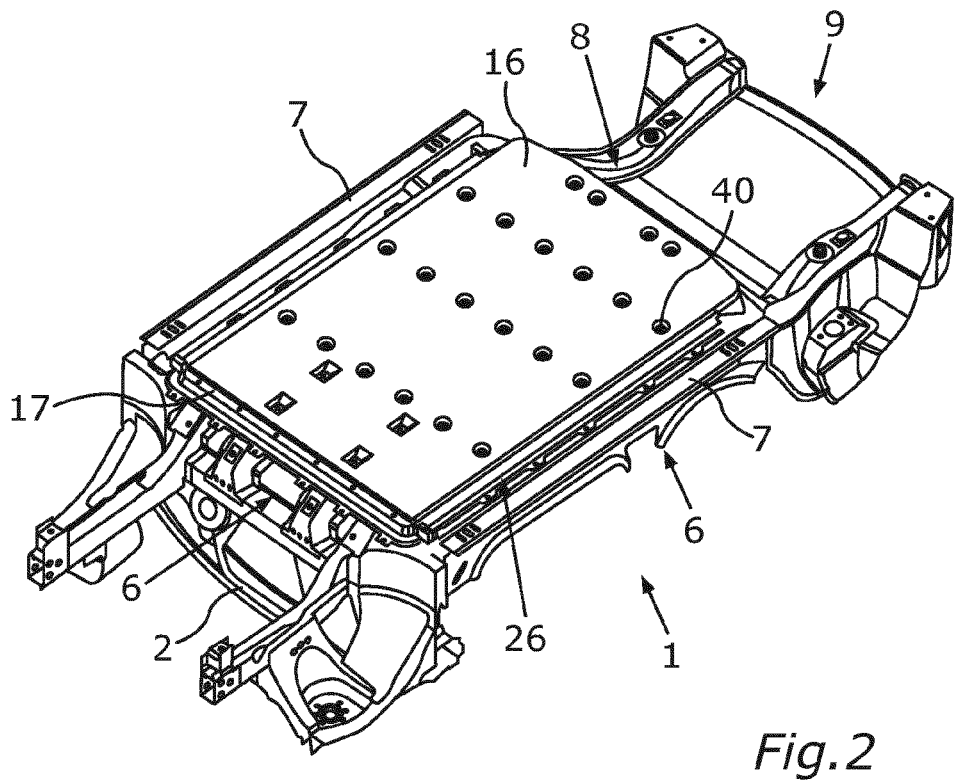
FIG. 2 is a perspective view from below of the energy-store floor assembly having the storage housing according to the embodiment in FIG. 1 formed by the body-in-white vehicle floor and the floor element external to the body-in-white.

A motor vehicle body 1 for an electrically operateable motor vehicle is illustrated in a perspective exploded view or a perspective lower view, respectively, in FIGS. 1 and 2. This motor vehicle can be, for example, one having a fully electric drive (BEV) or a hybrid vehicle (PHEV) which apart from a purely electric drive also has an internal combustion engine. The motor vehicle body 1 in the present case, in the usual manner comprises a front bulkhead 2 of a passenger cabin, which is adjoined toward the front by a front-end structure 3, the latter comprising, for example, the respective chassis beams/engine mounts 4 of a central chassis beam plane. The bulkhead 2, in a transition region 5 which comprises, for example, an obliquely running pedal box floor or the like, transitions toward the rear to a vehicle floor 6 which the delimits the passenger cabin toward the bottom and reaches up to rocker panels 7 running externally and horizontally in the vehicle longitudinal direction. The vehicle floor 6 toward the rear extends to a transition region 8 in which the vehicle floor 6 transitions to a rear-end structure 9.

Figure 3:
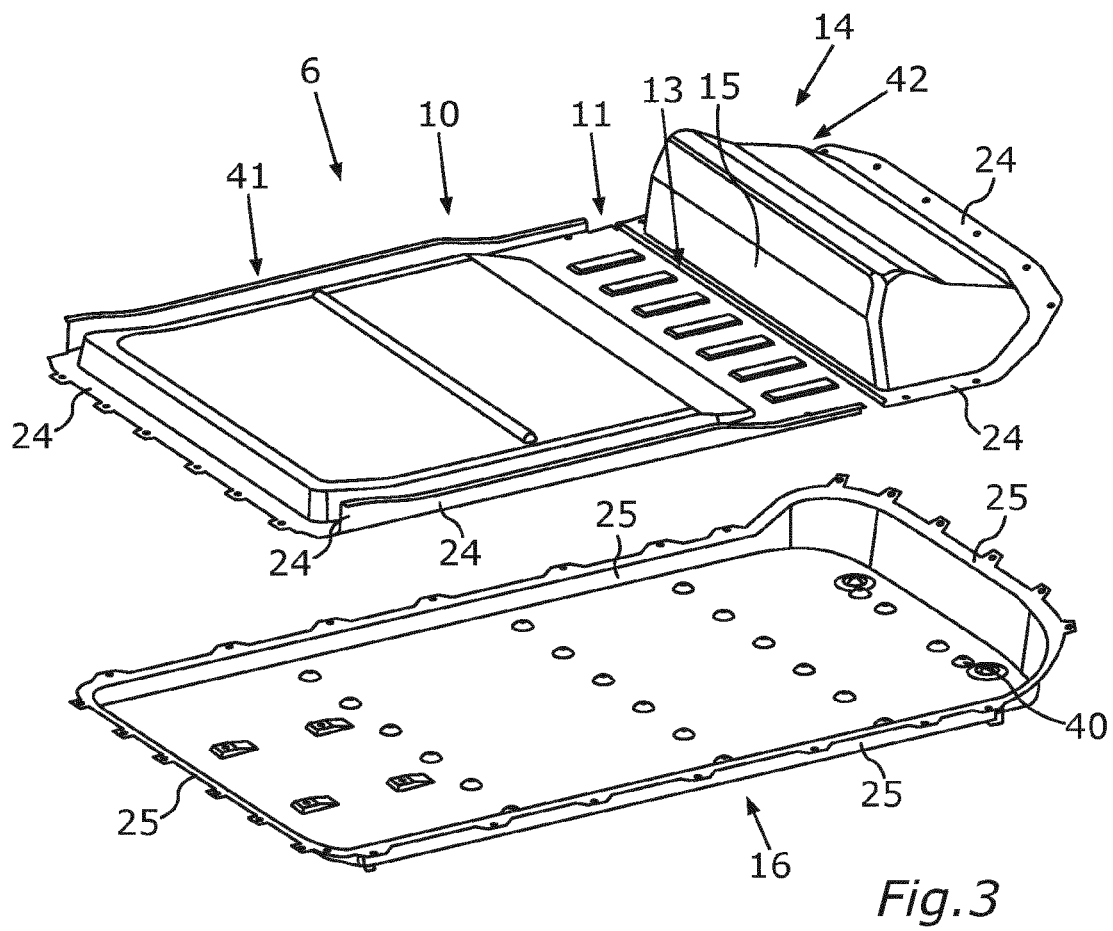
FIG. 3 shows respective perspective views of the vehicle floor which here is in two parts and illustrated separately from the motor vehicle body, the vehicle floor having the main floor and the rear floor as well as the further housing part that is configured as a floor element external to the body-in-white and conjointly with the main floor and the rear floor forms the storage housing, wherein the vehicle floor having the main floor and the rear floor, on the one hand, and the floor element, on the other hand, on the external circumference are connected to one another by way of a gas-tight connection.

In a perspective illustration in FIG. 3, the vehicle floor 6 is illustrated separately from the motor vehicle body 1. It can first be seen here that the vehicle floor 6 comprises a single piece main floor 10 which extends in the vehicle longitudinal direction toward the front at least up to the transition region 5 to the front bulkhead 2, and toward the rear at least up to a floor region 11 below and behind the front row of vehicle seats. The position of this front row of vehicle seats here becomes evident from the respective seat crossbeams 12 in FIG. 1, the respective row of vehicle seats of the front row of vehicle seats resting on the crossbeams 12.

The integral main floor 10 of the vehicle floor 6 by way of a gas-tight connection 13 that runs in the vehicle transverse direction is connected to a rear floor 14 which extends, for example, below the rear row of vehicle seats and comprises a so-called heel panel or heel element 15, respectively, which is disposed below a rear row of vehicle seats. The gas-tight connection 13 between the main floor 10 and the rear floor 14 here can be formed, for example, by a joint and/or a mechanical connection, and additionally by way of at least one sealing element, this in a manner yet to be described in more detail. The main floor 10 as well as the rear floor 14 extend across the at least substantially entire vehicle width so that the vehicle floor 6 in total comprises only two construction elements, specifically the main floor 10 and the rear floor 14. The main floor 10 and the rear floor 14 in the present exemplary embodiment are in each case formed from a body panel. Components of fiber-reinforced plastics material would likewise be conceivable in particular. An integral design embodiment of the vehicle floor 6 would likewise be conceivable.

Apart from the vehicle floor 6, the energy-store floor assembly comprises a further housing part in the form of a floor plate or a floor element 16, respectively, which—as can be seen in particular from FIGS. 1 to 4—is integrally designed and in the exemplary embodiment shown here, with the exception of a peripheral region, is designed so as to be at least substantially flat. In particular when viewing FIGS. 1 to 3 in combination it can be seen here that the floor element 16 and the vehicle floor 6 form respective housing parts of a storage housing 17 which is configured for receiving an electric energy-store installation 19 that can be seen in FIG. 4 and comprises a plurality of respective battery modules 18. These battery modules 18 are combined so as to form a respective battery pack 20, wherein respective supporting elements in the form of pressure plates 21 are provided, the pressure plates 21 being connected to one another by way of corresponding tension elements 22 and mutually bracing the individual battery modules 18.

Figure 4:
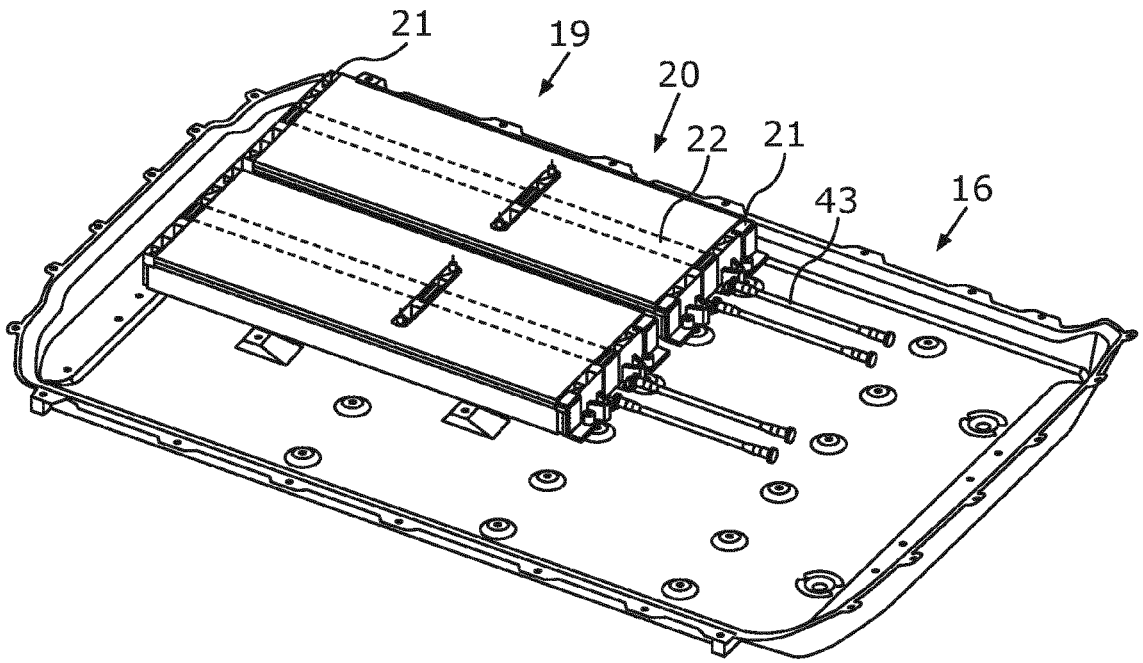
FIG. 4 is a perspective view of the floor element, a plurality of battery modules of the energy-store installation being disposed on the upper side of the floor element.

In a perspective view of the floor element 16 in FIG. 4, two of these battery packs 20 are illustrated in the arrangement thereof provided on the upper side of the floor element 16.

Overall, it thus becomes evident that the two-part vehicle floor 6 and the floor element 16 represent the housing parts that form the storage housing 17 for the energy-store installation 19. It is thus necessary inter alia that these two housing parts—the body-in-white vehicle floor 6 and the floor element 16 external to the body-in-white—have to be connected to one another by way of a gas-tight connection 26 which encircles the external circumference and can be seen in a fragmented and perspective sectional view of the energy-store floor assembly in FIG. 5.

Figure 5:
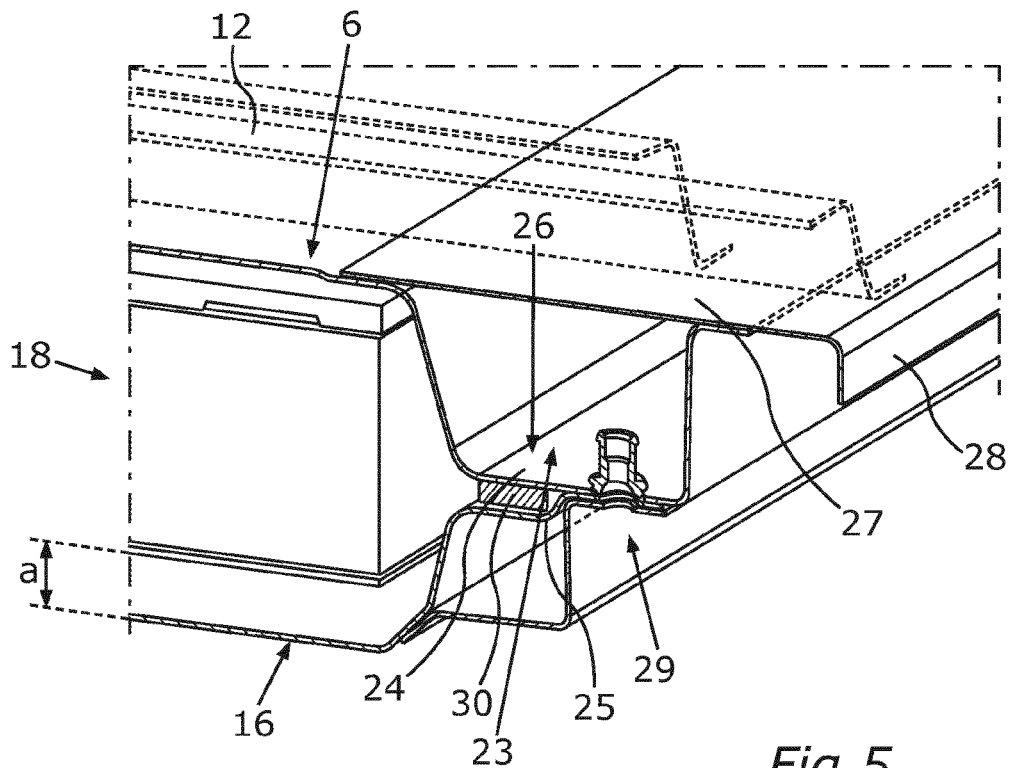
FIG. 5 is a fragmented and perspective sectional view of the gas-tight connection of the vehicle floor, as the one housing part, and of the floor element, as the further housing part of the storage housing.

The vehicle floor 6 in a largely front longitudinal region of the main floor 10 has a corrugation 23 which can be readily seen in FIG. 5 and in the cross section is substantially U-shaped and by way of which a respective supporting element is formed that reinforces the vehicle floor 6 in particular in the vehicle longitudinal direction and moreover provides a connecting region or flange 24, respectively, of the vehicle floor 6, the flange 24 conjointly with a flange 25 on the sides of the floor element 16 establishing the gas-tight connection 26. The supporting element, or the corrugation 23, respectively, here for reinforcement is closed on the upper side by a closing element, for example a closing plate 27. The vehicle floor 5 in the region of the main floor 10, in the vehicle transverse direction or laterally beyond the supporting element 23, respectively, extends up to a flange 28 by way of which the vehicle floor 6 is connected to the laterally assigned rocker panel 7. It can consequently be seen that the respective supporting element 23 which also forms the flange 24 for the gas-tight connection 26 to the floor element 16, is disposed at a lateral spacing from the respective rocker panel 7, or in the vehicle transverse direction is spaced apart from the respective rocker panel 7, respectively. Consequently, the storage housing 17 on the inside terminates at a lateral spacing from the respective rocker panel 7. This offers particularly favorable advantages for example in the event of a lateral impact.

Furthermore, the vehicle floor 6 on the upper side is not only reinforced by the seat crossbeams 12 but additional special crossbeams for increasing the rigidity of the energy-store floor assembly are provided. As a result, it is possible for the storage housing 17 to dispense with substantial reinforcement elements, or the entire energy store conjointly with the storage housing 17 and the energy-store installation 19 being configured as an integral component part of the motor vehicle body 1, or of the body-in-white, respectively.

It can again be seen in particular from FIG. 2 that the floor element 16 and thus the entire storage housing 17 terminates at a lateral spacing from the respective rocker panel 7. The floor element 16 extends toward the front up to the transition region 5 between the vehicle floor 6 and the bulkhead 2. In this region, the gas-tight connection 26 also runs in an encircling manner between the floor element 16 and the vehicle floor 6. The floor element 16, or the rear floor 14 of the vehicle floor 6, respectively, extends toward the rear into the transition region 8 to the rear-end structure 9. The gas-tight connection 26 is also provided in this region, the gas-tight connection 26 consequently being configured so as to encircle the two housing parts—the vehicle floor 6 and the floor element 16—in a substantially rectangular manner.

It can in particular be seen from FIG. 5 here that the gas-tight connection 6, or the flanged connection, respectively, comprises a plurality of mechanical connecting elements, in the present case in the form of respective screw-connection elements 29 which, in terms of the direction of sealing, are disposed on the outside of a seal 30 that in the region of the flanged connection runs between the flanges 24 and 25. In other words, the sealing of the storage housing 17 by means of the seal 30 preferably takes place on the inside of the respective mechanical connecting elements 29 so that the latter per se do not have to be sealed, but only the two flanges 24, 25 have to be sealed in relation to one another. The screw-connection elements 29 here ensure a compression not only of the respective flanges 24, 25 but optionally also of the seal 30. The seal 30 here can be, for example, a gasket (in particular a flat gasket or a profiled gasket), a dispersion seal (adhesive on one side or both sides), or an adhesively bonded seal. Customary solutions here are known to the person skilled in the art.

In the present case, the vehicle floor 6 conjointly with the main floor 10 and the rear floor 14 is configured as part of the painted motor vehicle body-in-white and is consequently produced conjointly with the motor vehicle body 1 during a body-in-white assembly. Subsequently, the motor vehicle body 1 and thus also the vehicle floor 6, for example in the context of a cathodic dip-paint coat and optionally also in the context of a further painting step are provided with corresponding paint layers. The assembly of the energy-store installation 19 and of the floor element 16, or the creation of the entire energy store and of the storage housing 17, respectively, consequently takes place in a subsequent assembly step outside the body-in-white assembly.

Figure 6:
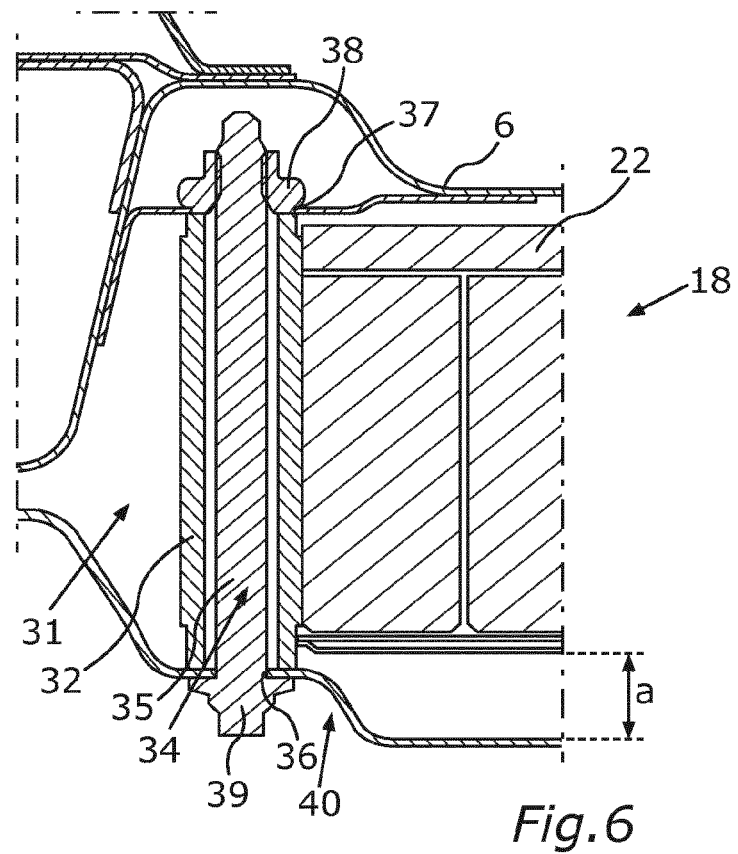
FIG. 6 is a fragmented sectional view through the storage housing in the region of a mechanical connection element between the vehicle floor and the floor element.

The fastening of the respective battery packs 20, or battery modules 18, respectively, can be readily seen from FIG. 6. Provided to this end are a plurality of respective mechanical connection elements 31 by means of which the further housing part in the form of the floor element 16 and the vehicle floor 6 are connected in a central region of the storage housing 17. The mechanical connection elements 31 here have substantially two functions and advantages: on the one hand, the respective battery modules 18, or battery packs 20, respectively, are disposed directly with the vehicle floor 6 in a quasi-suspended arrangement, or between the vehicle floor 6 and the floor element 16, respectively; on the other hand, the floor element 16 per se, by way of the mechanical connection elements 31, is also connected in a rigid and stable manner to the vehicle floor 6 in a central region. Each of the mechanical connection elements 31 here comprises a supporting element 32 which in the present case is configured as a respective pressure plate 21 of the respective battery pack 20—as can be seen from FIG. 4. This respective supporting element, or the respective pressure plate 32, respectively, is penetrated by a passage opening 33 for a screw element 34, wherein the screw element 34 penetrates not only the respective pressure plate 21 of the corresponding battery module 18, or battery pack 20, respectively, but also the respective housing parts of the storage housing 17, specifically the floor element 16 and the vehicle floor 6. Respective screws 35 by way of the associated openings 36 in the floor element 16 and by way of the passage opening 33 in the respective pressure plate 21 are inserted here and on the upper side guided out of the vehicle floor 6 again through a respective opening 37 and secured with a screw nut 38. By tightening the respective screw elements 34, the floor element 16, by way of the respective pressure plate 21, is braced in relation to the vehicle floor 6, on the one hand, and the respective battery pack 20 having the multiplicity of battery modules 18 is fastened to the lower side of the vehicle floor 6, on the other hand.

A gas-tight seal which cannot be seen in more detail here is in each case provided between a screw head 39 of the respective screw 35 and the floor element 16, on the one hand, and the respective screw nut 38 and the vehicle floor 6, on the other hand, such that each of the mechanical connection elements 31 is likewise configured in the gas-tight manner so that gas generated by the energy-store installation in the event of an emergency or an accident, for example, cannot leak outside, or into the vehicle interior, respectively.

When viewing FIGS. 3 and 4 in combination it moreover becomes evident that the battery packs 20 having the battery modules 18 are disposed in a front sub-region of the storage housing 17. To this end, the main floor 10 in the front sub-region thereof that extends approximately across three quarters of the length of the main floor 10 in the vehicle longitudinal direction, has a cuboid elevation 41. The rear floor 14 of the vehicle floor 6 also has a corresponding elevation 42, specifically proceeding from the heel panel 15 toward the rear. Connectors or power electronics as well as additional components such as safety switches or the like can be provided in this region. Lines 43 which can only be seen in FIG. 4 run in a region between the two elevations 41, 42, the region being disposed at the height level of the floor region 11, so that the storage housing 17 in this region has a smaller cross section.

Figure 7:
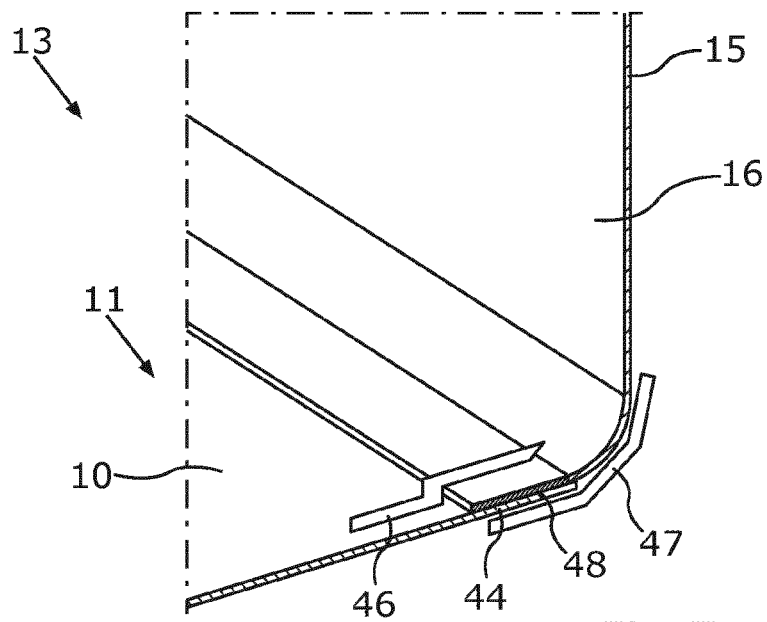
FIG. 7 is a perspective sectional view of the gas-tight connection between the main floor and the rear floor in the region of a heel panel of the vehicle floor.

The gas-tight connection 13 between the main floor 10 and the rear floor 14 in the region of the heel panel 15 is illustrated once more in a perspective sectional view in FIG. 7. It can be seen here in particular once again that the gas-tight connection 13 between the main floor 10 and the rear floor 14 is formed by a joint and/or a mechanical connection between a respective flange 44, 45 of the two floor parts 10, 14. Only a joint 48 produced by an adhesive is provided in the present case. Additionally, the flanged connection of the two flanges 44, 45 is sealed in relation to the passenger cabin, or to the storage housing 17, respectively, by means of a respective sealing element 46, 47. The sealing elements 46, 47 here ensure in particular the gas-tight connection of the sheet-metal boards of the main floor 10 and of the rear floor 14. The sealing elements 46, 47 in the present case are formed by PVC. The joint 48 and the sealing elements 46, 47 are in the present case applied during the body-in-white process, or the painting process, respectively.

Figure 8A:
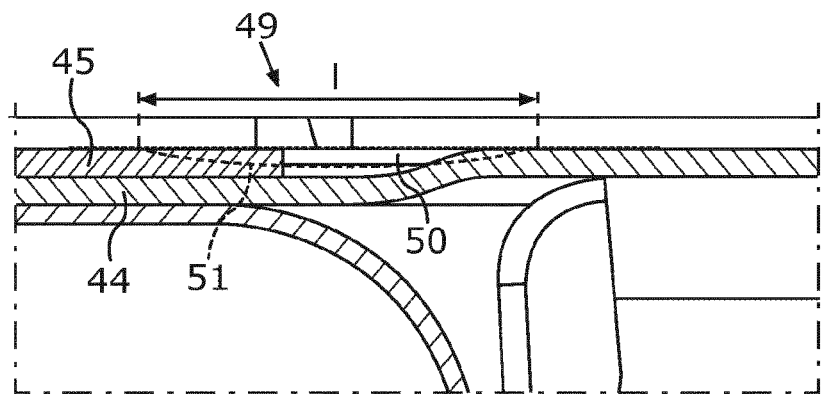
FIGS. 8a, 8b are respective fragmented sectional views of two potential gas-tight connections between the main floor and the rear floor in which an abutment joint, or a panel joint, respectively, between the two floor parts for bringing to bear a sealing element between the vehicle floor and the floor element, external to the body-in-white, is machined by filling and smoothing.
Figure 8B:
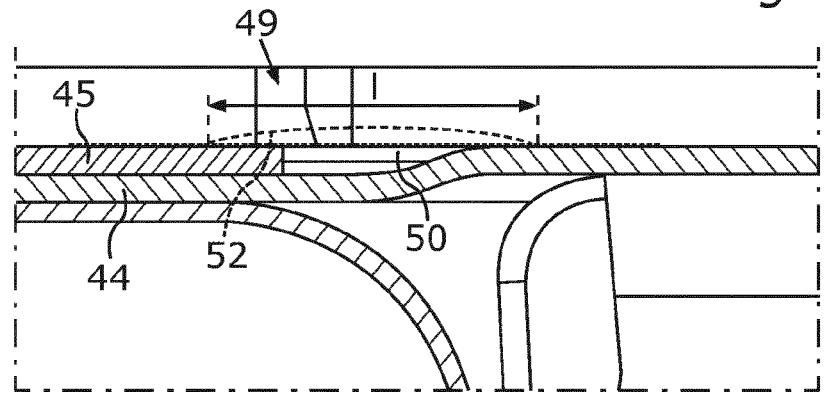

FIGS. 8a, 8b show respective fragmented sectional views of two potential embodiments of the gas-tight connections 13 between the main floor 10 and the rear floor 14, in which an abutment joint or a panel joint 49, respectively, between the two floor parts of the vehicle floor 6—the main floor 10 and the rear floor 14—have been machined for connection to the floor element 16. To this end, the panel joint 49, or the flanged connection of the two flanges 44, 45, respectively, has been smoothed at least in that region where the vehicle floor 6 by way of the gas-tight connection 26 is connected to the floor element 16.

According to the embodiments in FIGS. 8a and 8b here, a depression 50 created by the panel joint 49 has been filled with solder and smoothed by milling and/or grinding and/or brushing, this taking place in particular by way of a concavity (dashed line 51) according to FIG. 8a, or a convexity (dashed line 52) according to FIG. 8b in relation to a connecting plane formed by the planes of the two flanges 44, 45. An absence of burrs across a length region I of the panel joint 49 is in particular guaranteed here. Optionally it would also be conceivable for the panel joint 49 here to be embodied without a concavity or a convexity but so as to lie in the connecting plane.

As a result of this smoothing, a gas-tight connection between the main floor 10 and the rear floor 14, on the one hand, and the floor element 16, on the other hand, can subsequently be achieved, the gas-tight connection being established in a particularly reliable manner by way of the joint and/or the mechanical connection 29, and additionally by way of the at least one sealing element 30.

LIST OF REFERENCE SIGNS

1 Motor vehicle body
2 Bulkhead
3 Front-end structure
4 Chassis beam
5 Transition region
6 Vehicle floor
7 Rocker panel
8 Transition region
9 Rear-end structure
10 Main floor
11 Floor region
12 Seat crossbeam
13 Gas-tight connection
14 Rear floor
15 Heel panel
14 Floor element
17 Storage housing
18 Battery module
19 Energy-store installation
20 Battery pack
21 Pressure plate
22 Tension elements
23 Corrugation/supporting element
24 Flange
25 Flange
26 Gas-tight connection
27 Closing plate
28 Flange
29 Connecting elements
30 Seal
31 Connecting elements
32 Pressure plate
33 Passage opening
34 Screw element
35 Screw
36 Opening
37 Opening
38 Screw nut
39 Screw head
40 Corrugations
41 Elevation
42 Elevation
43 Lines
44 Flange
45 Flange
46 Sealing element
47 Sealing element
48 Joint
49 Panel joint
50 Depression
51 Line
52 Line

What is claimed is:

1. A vehicle floor for an energy-store floor assembly of a motor vehicle, the vehicle floor being disposed on an upper side of an electric energy-store installation that comprises a plurality of battery modules and is accommodated in a multiple-part storage housing, comprising:
a main floor that extends in a vehicle longitudinal direction forwardly at least up to a transition region to a front bulkhead and rearwardly at least up to a floor region below and behind a front row of vehicle seats, wherein the vehicle floor is configured as a housing part of the storage housing,
at least the main floor of the vehicle floor is one-piece,
a floor element is configured as a further housing part of the storage housing, and
the vehicle floor is connected to the floor element of the storage housing by way of at least one gas-tight connection.

2. The vehicle floor according to claim 1, further comprising:
a rear floor which extends below a rear row of vehicle seats, wherein
the rear floor adjoins the main floor to the rear in the vehicle longitudinal direction.

3. The vehicle floor according to claim 2, wherein
the main floor and the rear floor are connected to one another by way of a gas-tight connection.

4. The vehicle floor according to claim 3, wherein
the gas-tight connection between the main floor and the rear floor is formed by a joint and/or a mechanical connection, and additionally by at least one sealing element.

5. The vehicle floor according to claim 4, wherein
the main floor and the rear floor are connected to one another by a flanged connection which is smoothed at least in the region of the connection to the floor element configured as the further housing part.

6. The vehicle floor according to claim 2, wherein
the rear floor has a heel panel which extends at least substantially in the vehicle vertical direction.

7. The vehicle floor according to claim 1, wherein
the gas-tight connection is configured so as to encircle the vehicle floor and the floor element in a substantially rectangular manner.

8. The vehicle floor according to claim 1, wherein
the storage housing terminates so as to be laterally spaced apart from a respective rocker panel of the motor vehicle.

9. An energy-store floor assembly for a motor vehicle, comprising:
an electric energy-store installation that comprises a plurality of battery modules and is accommodated in a multiple-part storage housing; and
a vehicle floor according to claim 1, wherein
the electric energy-store installation is disposed on a lower side of the vehicle floor of the motor vehicle.

10. A vehicle floor for an energy-store floor assembly of a motor vehicle, the vehicle floor being disposed on an upper side of an electric energy-store installation that comprises a plurality of battery modules and is accommodated in a multiple-part storage housing, comprising:
a main floor that extends in a vehicle longitudinal direction forwardly at least up to a transition region to a front bulkhead and rearwardly at least up to a floor region below and behind a front row of vehicle seats, wherein the vehicle floor is configured as a housing part of the storage housing,
at least the main floor of the vehicle floor is one-piece,
a floor element is configured as a further housing part of the storage housing, the vehicle floor is connected to the floor element of the storage housing by way of at least one gas-tight connection, a rear floor extends below a rear row of vehicle seats, wherein the rear floor adjoins the main floor to the rear in the vehicle longitudinal direction, the main floor and the rear floor are connected to one another by way of a gas-tight connection, the gas-tight connection between the main floor and the rear floor being formed by a joint and/or a mechanical connection, and additionally by at least one sealing element, and the main floor and the rear floor are connected to one another by a flanged connection which is smoothed at least in the region of the connection to the floor element configured as the further housing part.

11. The vehicle floor according to claim 10, wherein the rear floor has a heel panel which extends at least substantially in the vehicle vertical direction.

12. The vehicle floor according to claim 10, wherein the gas-tight connection is configured so as to encircle the vehicle floor and the floor element in a substantially rectangular manner.

13. The vehicle floor according to claim 10, wherein the storage housing terminates so as to be laterally spaced apart from a respective rocker panel of the motor vehicle.

14. An energy-store floor assembly for a motor vehicle, comprising:

an electric energy-store installation that comprises a plurality of battery modules and is accommodated in a multiple-part storage housing; and a vehicle floor according to claim 10, wherein the electric energy-store installation is disposed on a lower side of the vehicle floor of the motor vehicle.

* * * * *